US011772161B2

(12) United States Patent
Liu

(10) Patent No.: US 11,772,161 B2
(45) Date of Patent: Oct. 3, 2023

(54) METHOD AND APPARATUS FOR IN SITU SYNTHESIS OF SIC, SIC CERAMIC MATRIX COMPOSITES, AND SIC METAL MATRIX COMPOSITES DURING ADDITIVE MANUFACTURING

(71) Applicant: Jian Liu, Saratoga, CA (US)

(72) Inventor: Jian Liu, Saratoga, CA (US)

(73) Assignee: PolarOnyx, Inc., Chapel Hill, NC (US)

( * ) Notice: Subject to any disclaimer, the term of this patent is extended or adjusted under 35 U.S.C. 154(b) by 619 days.

(21) Appl. No.: 16/736,596

(22) Filed: Jan. 7, 2020

(65) Prior Publication Data

US 2021/0205882 A1    Jul. 8, 2021

(51) Int. Cl.
*B22F 10/00* (2021.01)
*B33Y 10/00* (2015.01)
(Continued)

(52) U.S. Cl.
CPC ............... *B22F 10/00* (2021.01); *B22F 1/12* (2022.01); *B22F 10/28* (2021.01); *B22F 10/32* (2021.01);
(Continued)

(58) Field of Classification Search
CPC ........ B22F 10/00; B22F 1/0003; B22F 10/10; B22F 2302/105; B22F 1/052;
(Continued)

(56) References Cited

U.S. PATENT DOCUMENTS

| 6,046,426 A * | 4/2000 | Jeantette | ................. B29C 41/36 219/121.84 |
| 2016/0067778 A1* | 3/2016 | Liu | ......................... B22F 12/00 425/162 |
| 2016/0168668 A1* | 6/2016 | Lee | ......................... C22C 1/056 148/207 |

OTHER PUBLICATIONS

Adeel Umer et.al "Fabrication of Protective-coated SiC Reinforced Tungsten Matrix Composites with Reduced Reaction Phases by Spark Plasma Sintering" Met. Mater. Int., vol. 22, No. 3 (2016), pp. 493-500 (Year: 2016).*

(Continued)

*Primary Examiner* — Brian D Walck
*Assistant Examiner* — Nazmun Nahar Shams
(74) *Attorney, Agent, or Firm* — Taboada Law Firm, PLLC; John M. Taboada

(57) ABSTRACT

Methods and apparatuses for in situ synthesis of SiC, CMCs, and MMCs are disclosed, comprising: providing an apparatus having: an electromagnetic energy source; an autofocusing scanner; a powder system for SiC and one or more powders; a powder delivery system; a shielding gas comprising argon and/or nitrogen; and a computer coupled to and configured to control the energy source, scanner, powder system, and powder delivery system to deposit layers of the sample; programming the computer with specifications of the sample; using the computer to control electromagnetic radiation, mixing ratio, and powder deposition parameters based on the specifications of the sample; and using the autofocusing scanner to focus and scan the electromagnetic (Continued)

radiation onto the sample while the powders are concurrently deposited by the powder delivery system onto the sample to create a melting pool to deposit one or more layers onto the sample. Other embodiments are described and claimed.

11 Claims, 8 Drawing Sheets

(51) Int. Cl.
    *B33Y 30/00*     (2015.01)
    *B33Y 40/10*     (2020.01)
    *B33Y 70/10*     (2020.01)
    *B33Y 50/02*     (2015.01)
    *B22F 10/28*     (2021.01)
    *B22F 10/32*     (2021.01)
    *B22F 10/34*     (2021.01)
    *B22F 1/12*     (2022.01)
    *B22F 12/43*     (2021.01)
    *B22F 10/368*     (2021.01)
    *B22F 10/64*     (2021.01)
    *B22F 1/052*     (2022.01)
(52) U.S. Cl.
    CPC .............. *B22F 10/34* (2021.01); *B33Y 10/00* (2014.12); *B33Y 30/00* (2014.12); *B33Y 40/10* (2020.01); *B33Y 50/02* (2014.12); *B33Y 70/10* (2020.01); *B22F 1/052* (2022.01); *B22F 10/368* (2021.01); *B22F 10/64* (2021.01); *B22F 12/43* (2021.01); *B22F 2302/105* (2013.01)

(58) Field of Classification Search
    CPC .... B22F 10/368; B22F 2999/00; C22C 32/00; C22C 1/0416; C22C 1/045; C22C 1/05; C22C 21/00; C22C 27/04; C22C 29/065; C22C 32/0063; B29C 64/153; B29C 64/386; B33Y 10/00; B33Y 30/00; B33Y 40/10; B33Y 50/02; B33Y 70/10; Y02P 10/25
    See application file for complete search history.

(56) References Cited

OTHER PUBLICATIONS

Ciprian Bulei et al. "Aluminum matrix composites: the practice incorporation in the liquid metallurgy technique", ANNALS of Faculty Engineering Hunedoara—International Journal of Engineering Tome XVII (2019) (Year: 2019).*

* cited by examiner

METHOD AND APPARATUS FOR IN SITU SYNTHESIS OF SIC, SIC CERAMIC MATRIX COMPOSITES, AND SIC METAL MATRIX COMPOSITES DURING ADDITIVE MANUFACTURING

I. STATEMENT REGARDING FEDERALLY SPONSORED RESEARCH

The U.S. Government has a paid-up license in this invention and the right in limited circumstances to require the patent owner to license others on reasonable terms as provided for by the terms of the NASA SBIR contract number 80NSSC19C0268 and DOE SBIR contract DE-SC0019860.

II. BACKGROUND

The invention relates generally to the field of three-dimensional additive manufacturing systems. More particularly, the invention relates to a method and apparatus for in situ synthesis of SiC, SiC ceramic matrix composites (CMC), alloys (with large percentage of metal and small percentage of SiC), and SiC metal matrix composites (MMC) during the process of three-dimensional additive manufacturing.

III. SUMMARY

In one respect, disclosed is a method for in situ synthesis of SiC and SiC ceramic matrix composites, SiC and SiC metal matrix composites, alloys, and/or gradated SiC composition from two or more powders in additive manufacturing comprising: (a) providing an apparatus having: an electromagnetic energy source configured to generate electromagnetic radiation; an autofocusing scanner configured to receive the electromagnetic radiation from the electromagnetic energy source and to focus and scan the electromagnetic radiation onto a stage where a sample is additively manufactured; a powder system comprising N powder vessels for the two or more powders, wherein at least one of the two or more powders comprises SiC; a powder delivery system configured to receive the two or more powders from the powder system and to deposit the two or more powders onto the stage in the vicinity of the focused and scanned electromagnetic radiation; a shielding gas either within a process chamber or as a flowing gas, wherein the shielding gas comprises argon and/or nitrogen; and one or more computers coupled to the electromagnetic energy source, the autofocusing scanner, the powder system, and the powder delivery system and configured to control the electromagnetic energy source, the autofocusing scanner, the powder system, and the powder delivery system to deposit one or more layers of the sample for SiC and SiC metal matrix composite synthesis, SiC synthesis, and/or gradated SiC, wherein the one or more layers comprise at least one new material which differs from the two or more powders; (b) programming the one or more computers with structural and material specifications of the sample to be additively manufactured; (c) using the one or more computers to control electromagnetic radiation parameters; (d) using the one or more computers to control mixing ratio parameters between the two or more powders; (e) using the one or more computers to control powder deposition parameters based on the structural and material specifications of the sample programmed into the one or more computers; and (f) using the autofocusing scanner to focus and scan the electromagnetic radiation onto the sample while the two or more powders are concurrently deposited by the powder delivery system onto the sample in order to create a melting pool to deposit one or more layers onto the sample, wherein the one or more layers comprises SiC and SiC ceramic matrix composites, SiC and SiC metal matrix composites, and/or gradated SiC composition.

In another respect, disclosed is an apparatus for in situ synthesis of SiC and SiC ceramic matrix composites, SiC and SiC metal matrix composites, alloys, and/or gradated SiC composition from two or more powders in additive manufacturing comprising: an electromagnetic energy source configured to generate electromagnetic radiation; an autofocusing scanner configured to receive the electromagnetic radiation from the electromagnetic energy source and to focus and scan the electromagnetic radiation onto a stage where a sample is additively manufactured; a powder system comprising N powder vessels for the two or more powders wherein at least one of the two or more powders comprises SiC; a powder delivery system configured to receive the two or more powders from the powder system and to deposit the two or more powders onto the stage in the vicinity of the focused and scanned electromagnetic radiation; a shielding gas either within a process chamber or as a flowing gas, wherein the shielding gas comprises argon; and one or more computers coupled to the electromagnetic energy source, the autofocusing scanner, the powder system, and the powder delivery system and configured to control the electromagnetic energy source, the autofocusing scanner, the powder system, and the powder delivery system to deposit one or more layers of the sample for SiC and SiC metal matrix composite synthesis, SiC synthesis, and/or gradated SiC, wherein the one or more layers comprise at least one new material which differs from the two or more powders.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
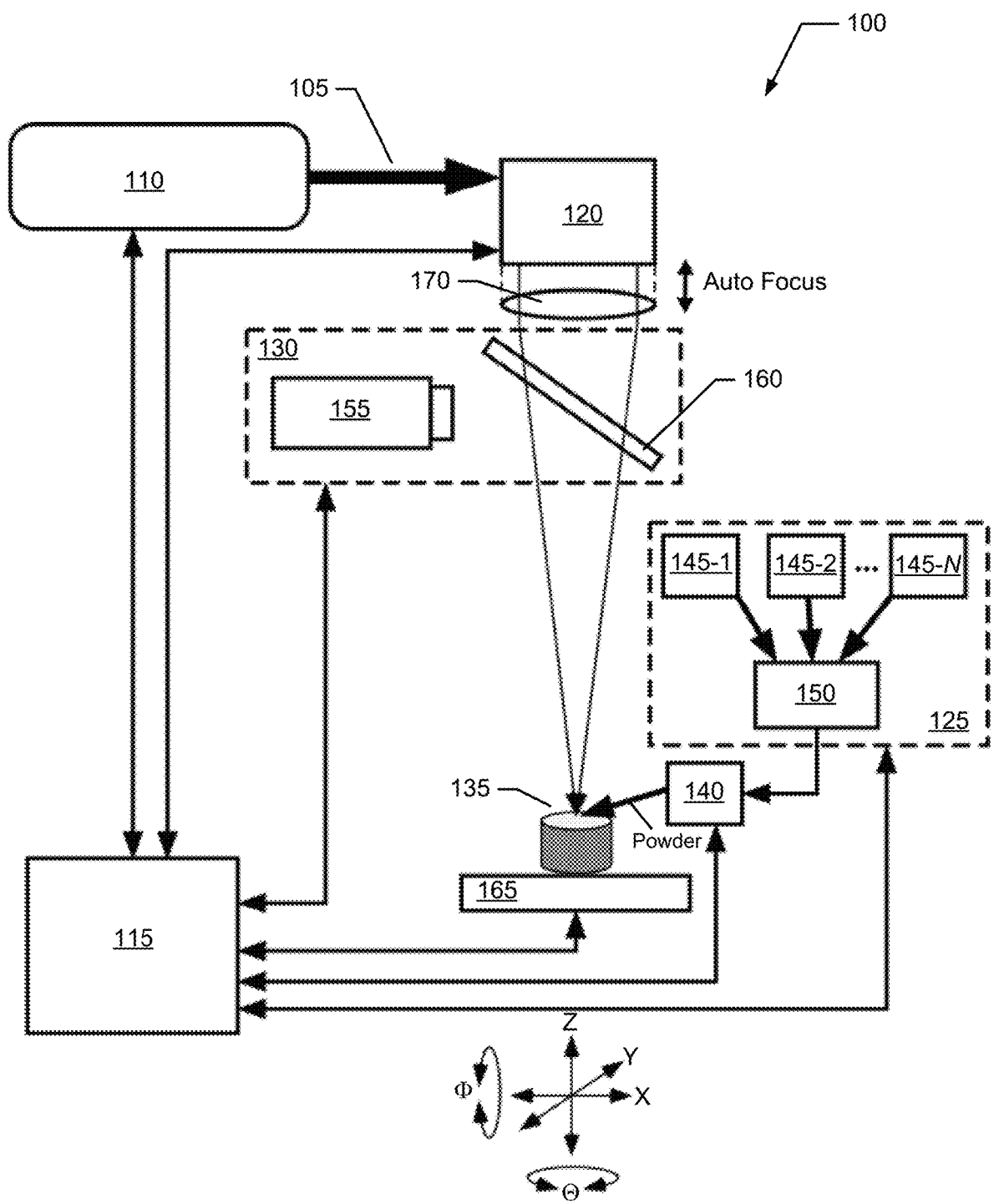
FIG. 1 is a schematic illustration of an apparatus for in situ synthesis of SiC, SiC CMCs, alloys, and SiC MMCs during three-dimensional additive manufacturing, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Current tools and technologies do not provide for the fabrication of parts having a complex shape and sophisticated composition for the custom tailoring of the properties of the parts. Additive manufacturing or 3D printing technology is an enabling technology which does provide for the fabrication of complex shapes, but unfortunately, current additive manufacturing technologies require that the powders with a given composition must be alloyed and made with either plasma or gas atomization techniques prior to their use in the additive manufacturing process. Moreover additive manufacturing of ceramic such as SiC usually involves binders for sintering at temperatures much lower than the melting point and the post heating and annealing.

Given these challenges, methods and apparatuses for additive manufacturing with in situ synthesis of SiC, SiC CMCs, and SiC MMCs which directly melt powders instead of binders are needed. The methods and apparatuses of the invention described herein may solve these shortcomings as well as others by proposing a novel method and apparatus for in situ synthesis of SiC, SiC CMCs, and SiC MMCs during three-dimensional additive manufacturing.

FIG. 1 is a schematic illustration of an apparatus for in situ synthesis of SiC, SiC CMCs, alloys, and SiC MMCs during three-dimensional additive manufacturing, in accordance with some embodiments.

In some embodiments, apparatus 100 comprises electromagnetic radiation 105 generated by an electromagnetic energy source 110, a computer 115, an auto focusing scanner 120, a powder system 125, and an inspection system 130. The auto focusing scanner 120 scans and focuses the electromagnetic radiation 105 onto a sample 135 being manufactured from the powder from the powder system 125 being deposited onto the sample 135 by a powder delivery system 140 which uses either a powder spreading method (powder bed fusion) or a powder injection method or a combination of both methods. The powder system 125 comprises N-number of powder vessels having different composition powders 145-1, 145-2, . . . , 145-N, where N is greater than or equal to two, which feed the different composition powders into a powder mixer 150 which mixes the predetermined amounts of each of the N-number of powders based on the desired in situ synthesis of new alloys and composites (such as ceramics, metal matrix composites) during three-dimensional additive manufacturing. In some embodiments, the powder system 125 does not have a powder mixer 150 and the powders are not premixed and instead, the powder from the powder vessels is delivered by the powder delivery system to the sample in an appropriate ratio in order to form metal alloys and metal matrix composites (high percentage metal) and ceramic matrix composites (high percentage of ceramics) during melting of the additive manufacturing process. A gas, such as argon and/or some other inert gas such as nitrogen (either within a chamber or as a flowing shielding gas) is used to shield the sample from the air to avoid oxidation and chemical reaction or interaction with the air. Depending on if nitride compound (such as boron nitride or silicon nitride) is generated or not, argon or nitrogen is used as the shielding gas. If nitrogen is used as the shield gas, silicon nitride $Si_3N_4$ can be synthesized or generated at high temperature: $3SiC+2N2 \rightarrow Si3N4$. The inspection system 130 comprises an imager and processor 155 which monitors the sample 135 (structure, temperature, shape, defects, cracks, roughness, and/or composition of the sample) through a dichroic filter 160 as the sample 135 is being additively manufactured. The scanner 120 may be an acousto-optic type scanner (diffraction), a magnetic resonant scanner, a mechanical scanner (rotating mirror), or an electro-optic scanner, etc. In some embodiments, the sample 135, may be positioned using its own linear and rotary motor stages 165, in X, Y, Z, Θ, and Φ. In some embodiments, the electromagnetic energy source 110 comprises a continuous wave (CW) or pulsed energy source such as an electron beam, a laser, an ultrasonic source, etc. The CW or pulsed energy source may be used in combination with spatial and temporal shaping to manipulate microstructures and mechanical properties at different locations during additive manufacturing (AM) fabrication. In some embodiments, the computer is used to control the electromagnetic energy source 110, to coordinate the scanner 120, to control the powder system 125, to control the inspection system 130, to control the powder delivery system 140, and/or to control the linear and rotary motor stages 165.

In some embodiments, the powder delivery system may be used for three categories of synthesis: (1) SiC and SiC metal matrix composite synthesis, (2) SiC and SiC ceramic matrix composite synthesis, and/or (3) gradated SiC composition synthesis during AM fabrication. The general synthesis during AM fabrication begins with materials A plus B to yield materials C and D, where at least one of materials C and D differ in composition and/or phase from materials A and B. Phase is a region of space, throughout which all physical properties of a material are essentially uniform. Examples of physical properties include density, index of refraction, magnetization, microstructure, crystal structure, and chemical composition.

Figure 2:
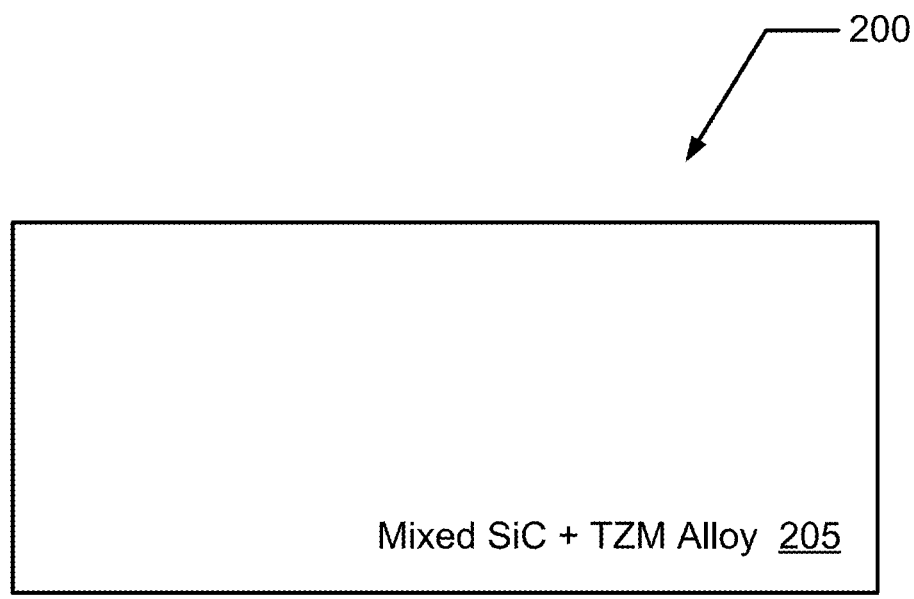
FIG. 2 is a schematic illustration of a mixed SiC and titanium-zirconium-molybdenum alloy sample formed during three-dimensional additive manufacturing, in accordance with some embodiments.

FIG. 2 is a schematic illustration of a mixed SiC and titanium-zirconium-molybdenum alloy sample formed during three-dimensional additive manufacturing, in accordance with some embodiments.

Figure 3:
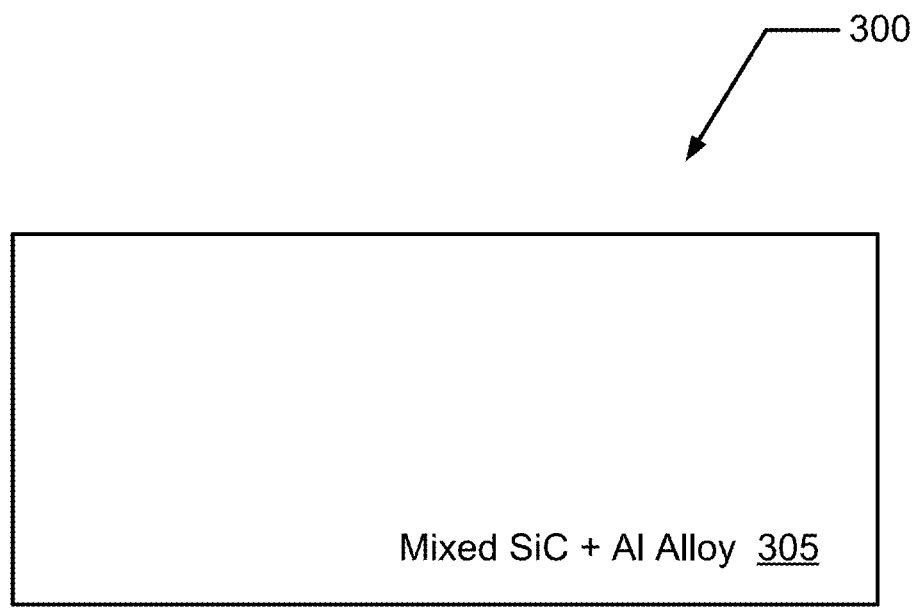
FIG. 3 is a schematic illustration of a mixed SiC and aluminum alloy sample formed during three-dimensional additive manufacturing, in accordance with some embodiments.

FIG. 3 is a schematic illustration of a mixed SiC and aluminum alloy sample formed during three-dimensional additive manufacturing, in accordance with some embodiments.

Figure 4:
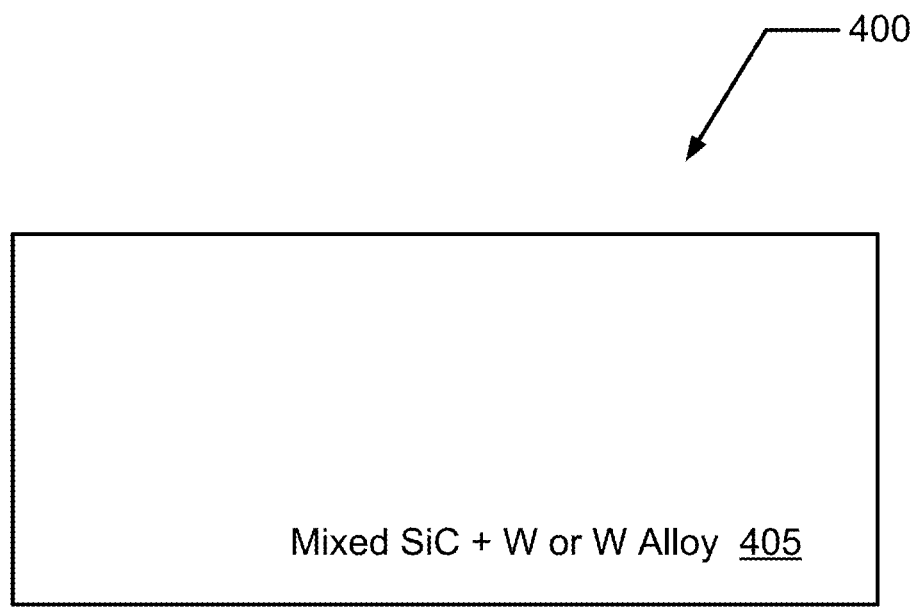
FIG. 4 is a schematic illustration of a mixed SiC and tungsten (W) or tungsten alloy sample formed during three-dimensional additive manufacturing, in accordance with some embodiments.

FIG. 4 is a schematic illustration of a mixed SiC and tungsten (W) or tungsten alloy sample formed during three-dimensional additive manufacturing, in accordance with some embodiments.

In some embodiments, for (1) SiC and SiC MMC synthesis, at least one metal powder and SiC powder are mixed, either premixed or mixed real time in-situ, and then new phases, new compounds, and/or alloys are synthesized either partially or totally during melting of the additive manufacturing process. By control of the ratio from 1-100 of mixing percentages (in volume %, wt %, or mol %), energy deposition (creating melting pool temperatures around the melting point of SiC, i.e. temperatures ranging between about 1000° C. to about 3500° C.), powder shape (spherical, whisker, wire, fiber, flake each of which is loaded into their own powder vessel of the N-number of powder vessels), and powder size (nano particle) and distribution, it can form metal alloys (high percentage of metal) and metal matrix composites (high percentage of ceramics) with desired performance. It might also generate amorphous single element. Metals can be selected from aluminum, iron, titanium, tungsten, rhenium, copper, molybdenum, zirconium, and their alloys (such as W—Re, W—Ni, CuCrZr, AlSi10Mg, Al7075, Al6061, SS316L, Ti6Al4V, etc.) In one example, SiC is used with titanium-zirconium-molybdenum (TZM) alloy. TZM is an alloy of 0.50% titanium, 0.08% zirconium, and 0.03% carbon with the balance molybdenum. It has a TEC of about $5.5 \times 10^{-6}$/K and a melting temperature of about 2600° C. TZM is a good match with SiC, which has a high melting temperature (~2830° C.), a low coefficient of thermal expansion (CTE) ($2-4 \times 10^{-6}$/K), and a high thermal conductivity (>120 W/(m·K)). Mixing both TZM and SiC powders with an appropriate ratio from 1-100 of SiC powder percentage to TZM powder percentage (for example <30% vol % TZM) may generate the CMC or MMC parts 200 of mixed SiC and TZM alloy 205, as illustrated in FIG. 2, with an excellent strength, stiffness, low TEC, low temperature dependent mechanical shift, and resistance to wear, radiation, and harsh environment (corrosion, temperature, erosion). In a second example, mixing both aluminum alloy and SiC powders with an appropriate ratio from 1-100 of SiC powder percentage to aluminum alloy powder percentage may generate the CMC or MMC sample 300 of mixed SiC and Al alloy 305, as illustrated in FIG. 3, with an excellent strength, stiffness, light weight, and resistance to wear and environment (corrosion, erosion). New compounds may also be synthesized. For example: SiC+Al yields to $Al_4C_3$ and Si. This will tailor the mechanical properties such as strength, stiffness, hardness, Young's modulus, wear resistance, thermal conductivity, and/or thermal expansion coefficient (TEC), to fit to certain applications, such as engine, brakes, sports tools, machine tools, aerospace parts, etc. The third example 400, illustrated in FIG. 4, is to mix W or W alloy with SiC with an appropriate ratio from 1-100 of SiC powder percentage to W or W alloy powder percentage to form a nuclear grade protection layer sample 405 to handle high temperature and high radiation environment in fusion energy. $WSi_2$, WC, $W_5Si_3$, and $W_2C$ may be synthesized during the process. Powder size (nano particle), shape (spherical, whisker, wire, fiber, flake, etc.) and distribution may be optimized for strength, stiffness, wear resistance, etc. This provides an excellent combination of high-temperature capability, relatively low neutron absorption, low radioactivity, high thermal conductivity, high mechanical strength, and excellent chemical stability. It can be used in high temperature environments such as nuclear reactors, plasma facing components, and nuclear propulsion rockets.

Figure 5:
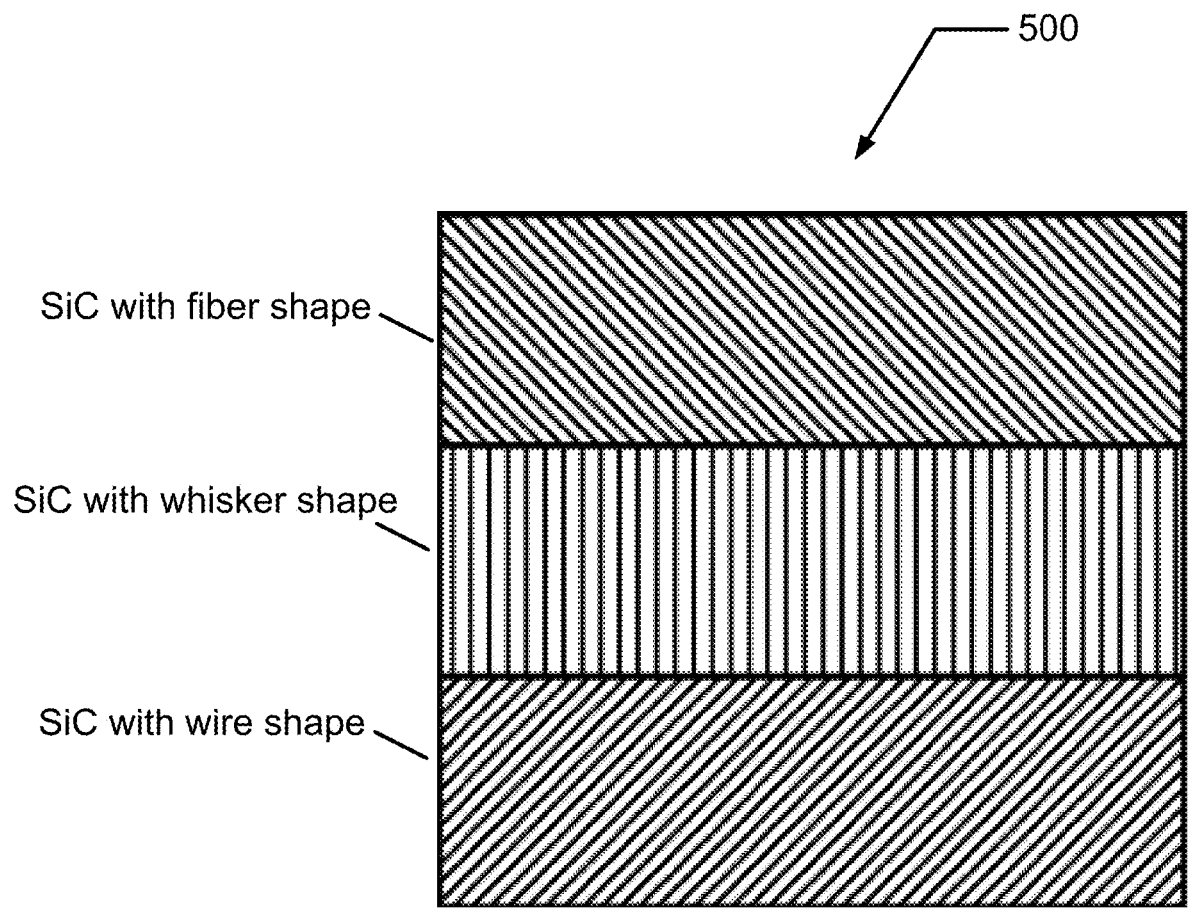
FIG. 5 is a schematic illustration of one combination of a SiC—SiC matrix composite formed during layer by layer three-dimensional additive manufacturing from fiber shaped SiC, whisker shaped SiC, and wire shaped SiC, in accordance with some embodiments. Other types of combination are possible.
Figure 6:
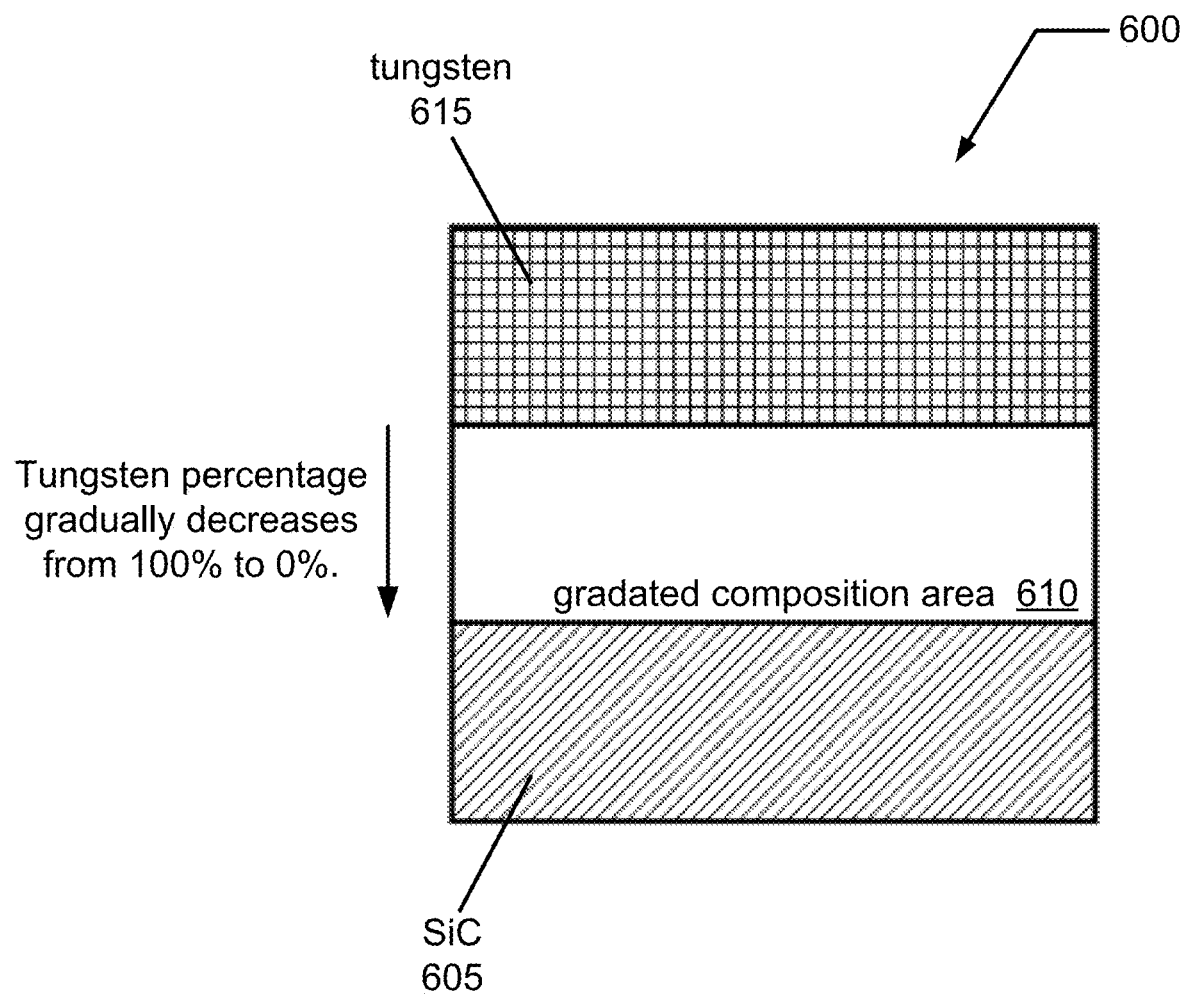
FIG. 6 is a schematic illustration of a gradated layer formed between tungsten and SiC during three-dimensional additive manufacturing, in accordance with some embodiments.

In some embodiments, for (2) SiC and SiC ceramic matrix composite synthesis, at least one non-metal powder and one ceramic powder with different compositions are mixed, either premixed or mixed real time in-situ, and then new phases and/or alloys are synthesized during melting of the additive manufacturing process. By control of the ratio of mixing (in volume, wt %, or mol %, e.g. from 1-100), powder shape (spherical, whisker, wire, fiber, flake), and powder size (nano particle, 1-70 μm size, or combination of nano particle and 1-70 μm size) and distribution, various types of CMC can be formed during the AM process. Examples of ceramic synthesis comprise mixing ceramic to form CMCs, such as silicon carbide (SiC) or silicon dioxide ($SiO_2$), with another non-metal element, such as carbon (C). For silicon carbide, the synthesis comprises SiC+C to yield SiC+Si or SiC+C. By combining different shapes of the powder (for example, fiber or wire types with sphere type), excellent strength can be achieved with the formation of CMC. For silicon dioxide, the synthesis comprises $SiO_2$+2C to yield Si and 2C) and $SiO_2$+3C to yield SiC and 2CO. It can also use Si powder synthesized directly with C (direct melting in AM process) to yield SiC. Another example is, by using different shapes and/or size or rotation orientations during the AM process, SiC—SiC matrix composite can be formed layer by layer. An example formed during layer by layer three-dimensional additive manufacturing from fiber shaped SiC, whisker shaped SiC, and wire shaped SiC is schematically illustrated FIG. 5. It can be used in high temperature environments such as nuclear reactors, plasma facing components, and nuclear propulsion rockets FIG. 6 is a schematic illustration of a gradated layer formed between tungsten and SiC during three-dimensional additive manufacturing, in accordance with some embodiments.

Figure 7:
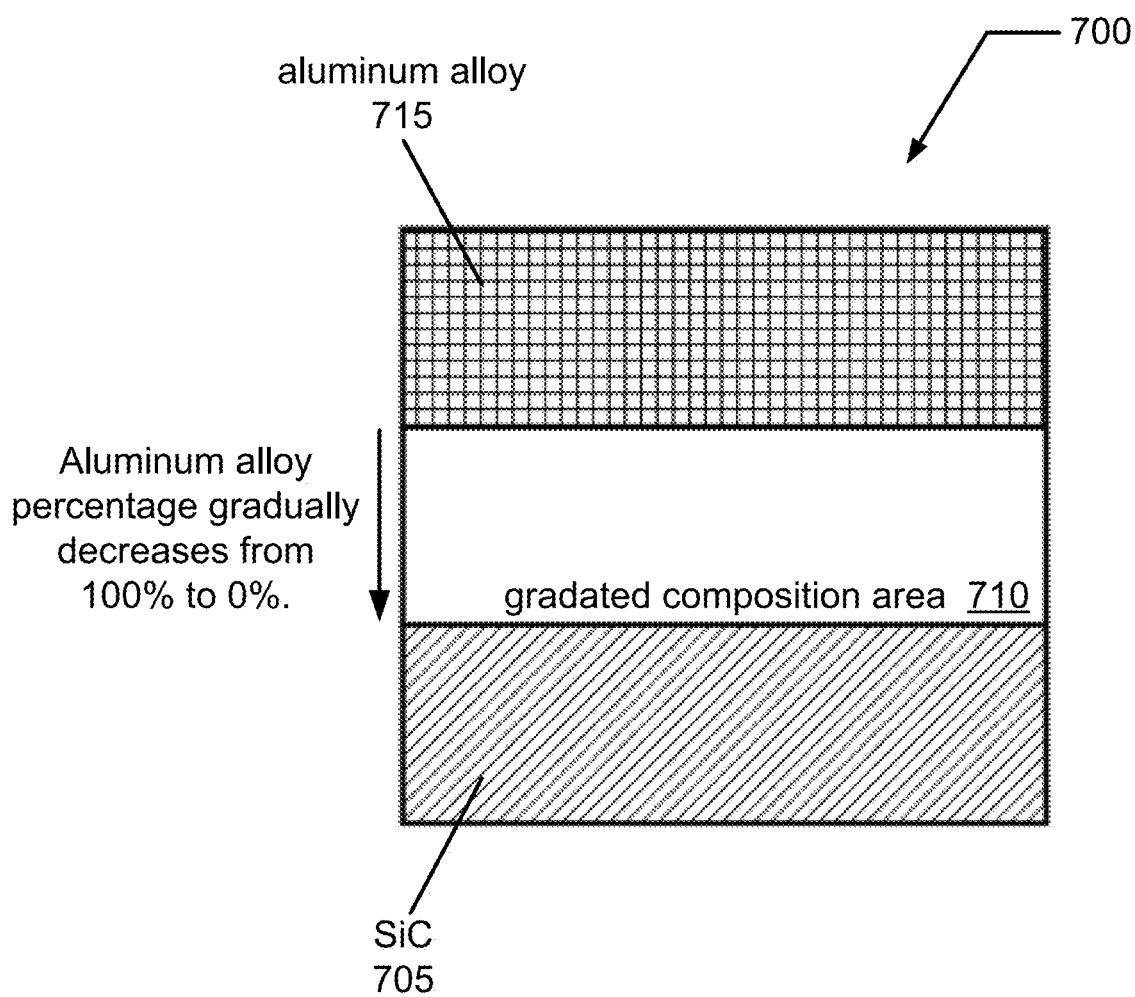
FIG. 7 is a schematic illustration of a gradated layer formed between aluminum alloy and SiC during three-dimensional additive manufacturing, in accordance with some embodiments.

FIG. 7 is a schematic illustration of a gradated layer formed between aluminum alloy and SiC during three-dimensional additive manufacturing, in accordance with some embodiments.

In some embodiments, for (3) gradated composition synthesis, metal powder(s) and SiC powder(s) are mixed, either premixed or mixed real time in-situ, and then synthesized during melting to have a gradated material composition during AM fabrication, resulting in a smooth material transition with increased bonding and improved strength. FIG. 6 illustrates an additively manufactured sample 600 comprising a SiC base 605, a gradated composition area 610, and a tungsten top layer 615, where the tungsten percentage gradually decreases from high percentage close to 100% to lower percentage close to 0% within the gradated composition area 610. Such a material 600 is used in high temperature environments such as nuclear reactors, plasma facing components, and nuclear propulsion rockets. FIG. 7 illustrates an additively manufactured sample 700 comprising a SiC base 705, a gradated composition area 710, and an aluminum alloy top layer 715, where the aluminum alloy percentage gradually decreases from 100% to 0% within the gradated composition area 710. Such a material 700 is used in high wear-resistance and light weight industries such as aerospace, automobiles, and sports. The use of the powder delivery system is not limited to AM with electron beam, laser, ultrasonic electromagnetic energy sources, but may be used with any 3D printing machine.

In some embodiments with a laser electromagnetic energy source (CW or pulsed), the laser pulse 105 has a tunable pulse repetition rate (PRR) between about 100 kHz and about 1 GHz, an average power from 1 W to 100 kW, a tunable pulse width between about 100 fs to about 10 ns, a maximum output pulse energy of about 500 µJ, and a center wavelength of about 1030 nm to about 1100 nm or other wavelength in the UV-IR (200 nm-2500 nm) spectral region (matching the best material absorption need for the additive manufacturing process and subtractive manufacturing process). The laser can be tuned to work for both additive manufacturing process (layer melting, manipulation of microstructures through tuning of pulse width or spatial shape or temporal shape) and subtractive manufacturing process (trimming of defects and geometrical shapes, hole drilling, surface microstructure modification, surface peening, surface polishing, etc.). In some embodiments, a continuous wave (CW) laser or quasi CW laser can be used. In some embodiments, the computer 115 is first used to convert CAD design to 3D printing procedures and contours. The conversion may also been done on some external computing device that is not part of the apparatus. The computer will be used to process and analyze the data gathered from the inspection system and to feedback to the three-dimensional manufacturing system to adjust the additive manufacturing laser, process, powder mixing, and powder delivery system parameters, such as laser power, pulse width, energy, pulse repetition rate, beam shape, temporal format, scanning speed, hatching space, scanning strategy/pattern, powder thickness, mixed powders etc., before either the next layer is additively manufactured or the current layer is repaired. The computer 115 is used to control the PRR, to control the power of the laser 110, to coordinate the scanner (scan speed, hatching space, scan pattern, focal position) 120, to control the mixing of the powders in the powder system 125, to control the deposition of the powder from the powder delivery system 140, and to control the linear and rotary motorized stages 165. In some embodiments, more than one computer is used to control and monitor. The electromagnetic radiation 105 is coupled into the auto focusing scanner 120 which scans and focuses the laser pulse 105 onto the sample 135 being manufactured from the powder being deposited by the powder delivery system 140, onto the stage at first and then subsequent layers of the sample 135, resulting in a strong weld/bond between the sample and the powder. The focal spot size of the laser pulse may be varied by the focusing lens 170. Beam shaping optics positioned between the laser and the scanner may also be used to modify the beam from Gaussian shape to flat top (square or round). Using a flat top beam shape results in a more uniform processed area than using a Gaussian beam shape, which helps to significantly reduce the non-uniformity of the melting pool and eliminates non-melted powders and thus increases the density and reduces the residual stress of the sample. The sample 135, may be positioned using its own linear and rotary motor stages 165, in X, Y, Z, Θ, and Φ. The inspection system 130 monitors the sample through the dichroic filter 160 as the sample 135 is being additively manufactured. The scanner 120 may be an acousto-optic type scanner (diffraction), a magnetic resonant scanner, a mechanical scanner (rotating mirror), or an electro-optic scanner, etc. An acousto-optic modulator may be used to optimize the laser pulse energy and format of pulses (pulsed modulated control in temporal domain) for melting pool temperature control, which further controls the temperature and cooling rate. A mechanical shutter may also be incorporated into the apparatus for safety. The apparatus is capable of layer-by-layer processing with multiple, different starting materials with micron level precision making complex shapes with fine structures achievable.

Figure 8:
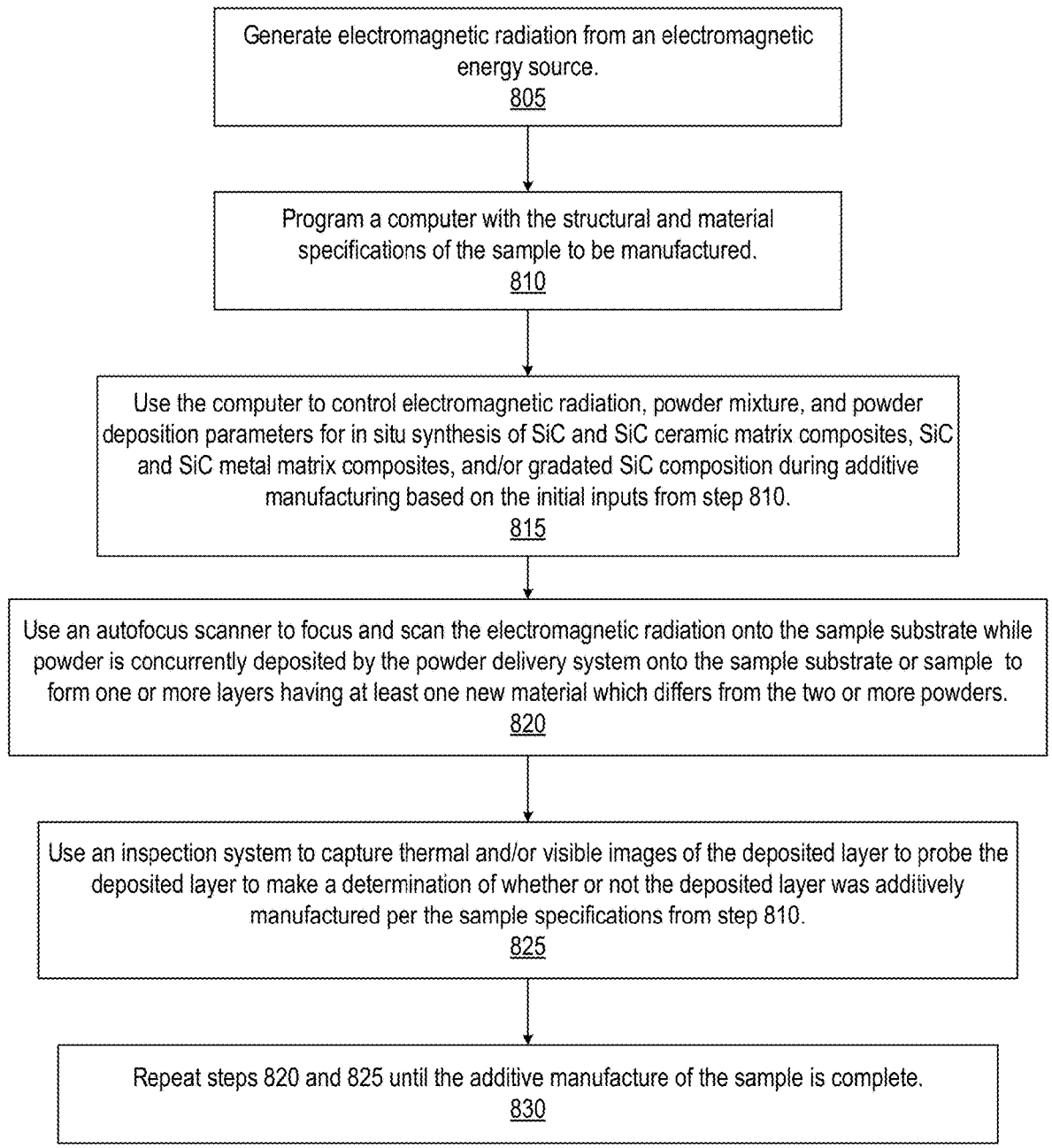
FIG. 8 is a block diagram illustrating a method for in situ synthesis of SiC, SiC CMCs, and SiC MMCs in three-dimensional additive manufacturing, in accordance with some embodiments.

FIG. 8 is a block diagram illustrating a method for in situ synthesis of SiC, SiC CMCs, and SiC MMCs in three-dimensional additive manufacturing, in accordance with some embodiments.

In some embodiments, processing begins at step 805 where an electromagnetic energy source is used to generate electromagnetic radiation which matches the material absorption of SiC and the one or more different powders to be used for the additive manufacturing process. At step 810, a computer is programmed with the structural and material specifications of the sample to be manufactured. Next, at step 815, the computer controls the electromagnetic radiation, powder mixture, and powder deposition parameters for in situ synthesis of SiC and SiC ceramic matrix composites, SiC and SiC metal matrix composites, and/or gradated SiC composition during additive manufacturing based on the initial inputs from step 810. At step 820, using an autofocusing scanner, the electromagnetic radiation is focused and scanned onto the sample substrate while powder is concurrently deposited by the powder delivery system onto the sample substrate to form one or more layers having at least one new material which differs from the two or more powders. In subsequent layers, the electromagnetic radiation is focused and scanned onto the previously deposited layer of the sample. In some embodiments, processing continues to step 825, where a determination is made of whether or not the just deposited layer was additively manufactured per the sample structural and material specifications from step 810 by capturing images (thermal images and/or visible images) of the additively manufactured sample with an inspection system. At step 830, steps 815 and 820 are repeated until the additive manufacture of the sample is complete. In some embodiments, the method further comprises a step between step 825 and step 830 where the one or more computers are used to adjust the electromagnetic energy source, the powder system, and/or the powder delivery system based on the determination made in step 825 prior to either additively manufacturing a subsequent layer onto the sample or making repairs to the deposited layer. Although the flowchart may describe the operations as a sequential process, the operations may be performed in parallel or concurrently. In addition, the order of the operations may be rearranged.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for in situ synthesis of SiC and SiC ceramic matrix composites, SiC and SiC metal matrix composites, alloys, and/or gradated SiC composition from two or more powders in additive manufacturing comprising:
   (a) providing an apparatus having:
      an electromagnetic energy source configured to generate electromagnetic radiation;
      an autofocusing scanner configured to receive the electromagnetic radiation from the electromagnetic energy source and to focus and scan the electromagnetic radiation onto a stage where a sample is additively manufactured;
      a powder system comprising N-number of powder vessels for the two or more powders, wherein at least one of the two or more powders comprises SiC;
      a powder delivery system configured to receive the two or more powders from the powder system and to deposit the two or more powders onto the stage where the sample is being manufactured;
      a shielding gas either within a process chamber or as a flowing gas, wherein the shielding gas comprises argon and/or nitrogen; and
      one or more computers coupled to the electromagnetic energy source, the autofocusing scanner, the powder system, and the powder delivery system and configured to control the electromagnetic energy source, the autofocusing scanner, the powder system, and the powder delivery system to deposit one or more layers of the sample for SiC and SiC metal matrix composite synthesis, SiC synthesis, and/or gradated SiC, wherein the one or more layers comprise SiC and SiC ceramic matrix composites, SiC and SiC metal matrix composites, and/or gradated SiC composition which differs from the two or more powders;
   (b) loading structural and material specifications of the sample to be additively manufactured into the one or more computers;
   (c) using the one or more computers loaded with the structural and material specifications of the sample to be additively manufactured to control electromagnetic radiation parameters of the electromagnetic energy source, wherein the controlling of the electromagnetic radiation parameters of the electromagnetic energy source is based on the structural and material specifications of the sample loaded into the one or more computers;
   (d) using the one or more computers loaded with the structural and material specifications of the sample to be additively manufactured to control mixing ratio parameters between the two or more powders of the powder system, wherein the controlling of the mixing ratio parameters is based on the structural and material specifications of the sample loaded into the one or more computers;
   (e) using the one or more computers loaded with the structural and material specifications of the sample to be additively manufactured to control powder deposition parameters of the powder delivery system, wherein the controlling of the powder deposition parameters is based on the structural and material specifications of the sample loaded into the one or more computers; and
   (f) in-situ synthesizing SiC by focusing and scanning the electromagnetic radiation onto the sample with the autofocusing scanner while the two or more powders are concurrently deposited by the powder delivery system onto the sample in order to create a melting pool to deposit one or more layers onto the sample, wherein the one or more layers comprises SiC and SiC ceramic matrix composites, SiC and SiC metal matrix composites, and/or gradated SiC composition.

2. The method of claim 1, wherein the SiC comprises at least one of a spherical shaped SiC powder, a whisker shaped SiC powder, a wire shaped SiC powder, a fiber shaped SiC powder, and a flake shaped SiC powder.

3. The method of claim 1, wherein one of the two or more powders comprises a metal powder wherein the metal comprises at least one of aluminum, iron, titanium, tungsten, rhenium, copper, molybdenum, zirconium, and alloys of the same.

4. The method of claim 3, wherein the one of the two or more powders comprises TZM comprising SiC powder mixed with less than 30% by volume of the TZM to synthesize a mixed SiC and TZM MMC.

5. The method of claim 3, wherein the one of the two or more powders comprises TZM comprising SiC powder mixed with greater than 70% by volume of the TZM to synthesize a mixed SiC and TZM alloy.

6. The method of claim 1, wherein one of the two or more powders comprises a spherical shaped SiC powder, a whisker shaped SiC powder, a wire shaped SiC powder, a fiber shaped SiC powder, and/or a flake shaped SiC powder to synthesize a CMC.

7. The method of claim 1, wherein the melting pool has a temperature ranging from about 1000° C. to about 3500° C.

8. The method of claim 1, wherein the SiC comprises at least one of a spherical shaped SiC powder, a whisker shaped SiC powder, a wire shaped SiC powder, a fiber shaped SiC powder, and a flake shaped SiC powder;
   wherein one of the two or more powders comprises a metal powder wherein the metal comprises at least one of aluminum, iron, titanium, tungsten, rhenium, copper, molybdenum, zirconium, and alloys of the same; and
   wherein the one or more layers comprises a gradated material composition from layer to layer to form a gradated transition between 100% SiC to 100% metal.

9. The method of claim 1, wherein the two or more powders comprises at least one of nano particle size powders, 1-70 μm particle size powders, and combinations thereof.

10. The method of claim 1, wherein the powder system further comprises:
    a powder mixer configured to receive and mix a predetermined amount of each of the two or more powders from the N-number of powder vessels prior to sending to the powder delivery system.

11. The method of claim 1, wherein if the shielding gas comprises nitrogen, then the SiC and SiC ceramic matrix composites comprises $Si_3N_4$.

* * * * *